July 30, 1929.  R. L. JONES  1,722,751
OPTICAL INSPECTION SYSTEM
Filed Nov. 19, 1927
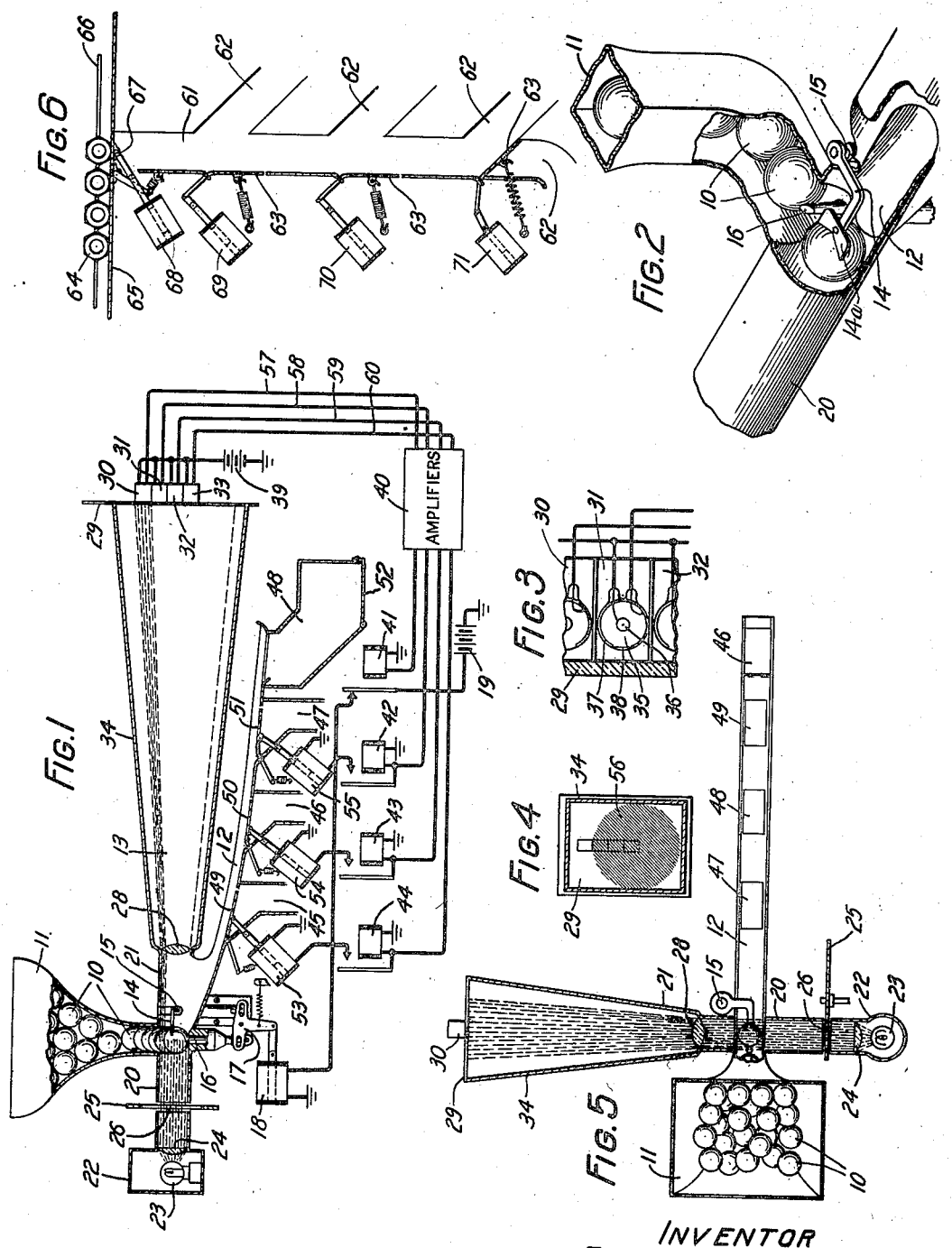
INVENTOR
REGINALD L. JONES
BY Walter C. Kiesel
ATTORNEY Patented July 30, 1929.

1,722,751

UNITED STATES PATENT OFFICE.

REGINALD L. JONES, OF SUMMIT, NEW JERSEY, ASSIGNOR TO BELL TELEPHONE LABORATORIES, INCORPORATED, OF NEW YORK, N. Y., A CORPORATION OF NEW YORK.

OPTICAL INSPECTION SYSTEM.

Application filed November 19, 1927. Serial No. 234,415.

This invention relates to an optical inspection system and more particularly to an automatic inspectoscope for inspecting and sorting articles automatically according to their size or configuration.

In the inspection of various articles of manufacture the accuracy of determining close limits, and the detection of irregularities in configuration of the articles, demand correspondingly accurate measuring facilities and considerable precision on the part of the inspector performing the inspection. Heretofore, this was accomplished by projecting a magnified image of the article on a screen through a projection microscope and relying on the visual powers of the inspector to detect the irregularities from the magnified image.

An object of this invention is to facilitate inspection of articles of manufacture, so that irregularities of size or configuration may be automatically detected, and the human equation element entirely eliminated.

In one embodiment of the invention, the articles of manufacture, such as bearing balls, are supplied from a hopper to a measuring position where they are held on the optical axis of a beam of light produced through a projecting lens on one side of the ball and a magnifying lens on the opposite side. A series of light responsive devices are arranged in a vertical plane a predetermined distance in front of the magnifying lens, so that a magnified shadow image of the ball is projected on the light responsive devices. A chute containing a plurality of receptacles having operable traps leads from the measuring position on which the bearing balls are placed for inspection. The light responsive devices control the operation of the traps through relays and actuating mechanisms, to deposit the balls in the several receptacles in accordance with the image projected on the light responsive devices. When the shadow image of the ball falls on the lower devices in the vertical plane a light beam impinges on the responsive devices unobstructed by the shadow image, to cause the relays associated with these devices to operate the actuating mechanism of the traps and thereby cause the ball under inspection to be deposited in a definite receptacle according to its size or configuration. This inspection and sorting is continued automatically as each ball is positioned on the optical axis of the beam, so that the balls are distributed to the several receptacles according to their size or configuration as projected by the magnified shadow image appearing before the light sensitive devices.

The invention may also be utilized for the inspection of various other articles of manufacture, such as nuts, bushings, washers or any other articles where the inspection for size or configuration requires considerable time and manual attention or where the quantity is large and difficult to handle individually.

The invention may be more fully understood from the following detailed description and the accompanying drawing in which:

Fig. 1 is a side view of the automatic inspectoscope made in accordance with this invention with parts of the mechanical structure in cross section and the electrical system shown schematically;

Fig. 2 is an enlarged perspective view of a portion of Fig. 1 with parts broken away to illustrate the mechanism for positioning the article to be inspected on the optical axis of the projection microscope;

Fig. 3 shows in more detail the arrangement of the photo-electric cells behind the transparent screen;

Fig. 4 illustrates the shadow mask projected on the screen and the light sensitive devices;

Fig. 5 is a plan view showing a modified arrangement of the projection apparatus and the screen with respect to the supply hopper and the distributing chute; and Fig. 6 illustrates a different arrangement of the chute for the distribution of other articles of manufacture for example, nuts, which may be automatically inspected in accordance with this invention.

Referring to Fig. 1 the articles to be inspected for size or configuration, such as bearing balls 10, are fed from a supply hopper 11 which is supported above the inclined distributing chute 12. The balls are fed by gravity to the focusing point, or measuring position, at the upper end of the chute 12 and are positioned on the optical axis of the projection microscope 13 by an extension arm 14 having a removable centering member 14ª which is shaped to receive the ball. This arm is carried by a reciprocating member 15 as shown more clearly in Fig. 2. A stop pin 16 cooperating with the member 15 allows only one ball to be supplied to the focusing point at the upper end of the chute. The reciprocating member 15 is slidably attached to one end of a pivoted lever 17 and the stop pin 16 is slidably attached to the other end thereof. A solenoid or electromagnet 18 having its armature pivotally connected to the lever 17 is normally energized by a battery 19 so that the centering member on the arm 14 engages the ball located at the measuring position, and the stop pin 16 prevents the movement of the other balls in the hopper 11. The projection microscope 13 which is arranged in a horizontal position at the upper end of the chute 12 and at right angles to the hopper 11 comprises two tubular metallic members 20 and 21. At one end of the tubular member 20 is a housing 22 containing a light source, such as an electric lamp 23, and a collimating lens 24 for directing a beam of light toward the ball 10 centered upon the optical axis of the light beam. A revolving opaque disc 25 having a transparent portion or open slot 26 is located between the light source and the focusing point at the end of the tube 20 and is rotated by any suitable means, such as a motor (not shown) at a predetermined speed so that the light beam is cut off during certain intervals of time after the ball located at the measuring position has been released and distributed according to its size or configuration. The tubular member 21 extends over the chute 12 and is closed at the outer end by a magnifying lens 28. A transparent screen 29 is arranged at a distance in front of the projection microscope 13 and a bank of light-proof compartments 30, 31, 32 and 33 containing light sensitive devices are arranged in a vertical plane behind the screen 29, to receive light through the projection microscope. A light-proof chamber 34 extending from the end of the projection microscope to the screen 29 prevents any external light rays affecting the operation of the light sensitive devices.

The light sensitive devices are preferably photo-electric cells 35 shown more clearly in Fig. 3. Each of these cells consists of a glass enclosing vessel containing a central anode 36 in the form of a circular wire and a light sensitive coating 37 on the inner surface of the vessel which acts as the cathode. A window 38 is provided in the vessel to permit light to enter the cell. Suitable leading-in wires attached to the electrodes project from the sealed portion of the vessel. The anode 36 of each cell is connected to a grounded battery 39 and the cathodes of the cells are connected over individual circuits to the input of the amplifiers 40. A plurality of control relays 41, 42, 43 and 44, equal in number to the photo-electric cells 35 are connected to the output of the amplifiers 40, each associated through its amplifying circuit with its respective photo-electric cell. Control relay 41 is individually operated by the photo-electric cell 35 enclosed in compartment 30, while the successive control relays 42, 43 and 44 are individually operated by the photo-electric cells in the compartments 31, 32 and 33 respectively.

The inclined distributing chute 12 is provided with a number of receptacles or bins 45, 46, 47 and 48 to receive certain sized balls, depending on the image of the balls projected on the screen and photo-electric cells. The receptacles 45 to 47 inclusive are provided with movable traps 49, 50 and 51 respectively. These traps are normally held closed by springs below the chute 12. The last receptacle 48 is open to receive all bearing balls which are not distributed to the other receptacles. Each of the receptacles is provided with a hinged bottom 52 as shown in the receptacle 48, to remove the bearing balls therefrom. Associated with the traps 49 to 51 inclusive, are electromagnets or solenoids 53, 54 and 55 respectively. These solenoids are connected to energizing means through the armatures and contacts of the control relays 42, 43 and 44.

The method of automatically inspecting articles of manufacture in accordance with this invention is as follows: Assuming the hopper 11 is filled with a definite article of manufacture, for instance, bearing balls 10, as shown in Fig. 1, which are to be individually inspected for size and distributed according to their size. The first bearing ball is located on the optical axis of the projection microscope 13 by the arm 14 and the successive balls are prevented from further travel by the stop pin 16. The revolving disc 25 is rotated at a predetermined rate° of speed, dependent on the travel of the balls down the length of the chute 12 and the light source projects a beam of light through the tube 20. When the open slot or transparent portion of the revolving disc enters the tube 20 the light beam is thrown on the ball 10 being inspected and the ball being of solid metal cuts off the greater part of the beam and only allows a fringe of light to pass through the tube 21 of the projection microscope to the magnifying lens 28. The mass of the bearing ball causes a magnified shadow image of the size of the ball to be projected on the screen 29 as shown at 56 in Fig. 4, thereby masking the light sensitive cells in the compartments 31, 32 and 33. The light permitted to pass through the magnifying portion of the microscope impinges on the cell 35 in compartment 30, behind the screen 29, and causes an electric current to flow between the anode 36 and the cathode 37 of the photo-electric cell. This current is strengthened by the associated amplifier 40 and energizes the control relay 41 associated with the photo-electric cell 35 in compartment 30, whereby a circuit is completed which may be traced from grounded battery 39, anode 36, cathode 37, conductor 57, amplifier 40, winding of control relay 41, to ground. Relay 41 is energized to draw up its armature and disconnect battery 19 from the electromagnet 18 through the contact of relay 41. When electromagnet 18 is deenergized, pivoted lever 17 is drawn to the right, due to the spring attached thereto and at the same time raises the bar 15 to which the centering arm is attached. This action releases the ball which has been inspected. The ball rolls down the chute 12 and falls into receptacle 48 since all the other receptacles are closed by their respective traps. This determines that the ball 10 inspected is oversize and not perfect. The stop pin 16 pivotally attached to the lever 17 is drawn down and allows the next ball to roll into the measuring position of the projection microscope. While the second ball is rolling into position the open portion 26 of the revolving disc 25 has passed across the tube 20 and the opaque portion of the disc is now crossing the tube 20 to cut off the beam of light from the source 23, thereby discontinuing the photo-electric action in the cell 35 in compartment 30. As soon as current stops flowing in the photo-electric cell, relay 41 is deenergized and an operating circuit is completed for electromagnet 18 which may be traced from grounded battery 19, armature and contact of relay 41, winding of electromagnet 18, to ground. The operation of electromagnet 18 draws its armature pole piece into the solenoid winding, to shift the lever 17 to the left, thereby lowering the bar 15, so that the arm 14 engages the second ball and positions it on the optical axis of the microscope. At the same time the stop pin 16 is raised to prevent movement of the third ball in the hopper 11.

The opaque portion of the revolving disc 25 has completed its travel through the tube 20, whereupon the open slot or transparent portion 26 enters the tube and the light beam is thrown on the second ball now in position to be inspected. Assuming this ball is small in comparison to a perfect ball, then the mask which will be thrown on the screen 29 will be only sufficient to cover the cell in compartment 33. The light from the source 25 will then impinge on the photo-electric cells contained in the compartments 30, 31 and 32, and will cause current to flow in these cells to energize the control relays 41, 42 and 43. Control relay 41 will be energized in the same manner as described above, to disconnect battery 19 from electromagnet 18, thereby releasing the lever 17 to raise centering arm 14 and allow the ball to roll down the chute 12. The cells 35 in compartments 31 and 32 respectively will cause relays 42 and 43 to operate over circuits from grounded battery 39, cathodes and anodes of these cells, conductors 58 and 59 respectively, amplifiers 40, windings of relays 42 and 43 respectively, to ground. When relay 42 operates, a circuit is closed for electromagnet 55 through the armature and contact of relay 42 and winding of electromagnet 55. Energization of electromagnet 55 causes the armature thereof to be drawn into the winding of the electromagnet, and due to the link connection the trap 51 is drawn downward to open receptacle 47. At the same time a circuit is completed for electromagnet 54 through the armature and contact of relay 43 and winding of electromagnet 54. The trap 50 is drawn downward to open receptable 46. The ball will fall into receptacle 46 since this is the first opening in the chute. This receptacle will receive the balls which have been inspected and found to be undersized and not perfect. The rotating disc 25 will again cut off the light beam in a manner hereinbefore described and relays 41, 42 and 43 will be deenergized. When the operating circuit for magnet 18 is completed through the contact and armature of relay 41 centering arm 14 engages the ball which has been fed from the hopper and the stop pin 16 will hold the next ball out of the line of light projection.

Assuming now that the ball positioned on the optical axis of the projection microscope is a perfect ball. When the revolving disc 25 is rotated sufficiently to allow the light beam to pass through the microscope an image of the ball will mask the two lower photo-electric cells 35 in the compartments 32 and 33 and also allow a beam of light to impinge on the cells in compartments 30 and 31. Control relays 41 and 42 will be energized in the same manner as described above and electromagnet 55 will open the trap 51. The ball is released by the upward movement of the arm 14 and will roll down the chute 12 and fall into the receptacle 47.

The receptacle 45 may be provided to receive disfigured or flattened balls which may be in the lot under inspection. The image of a flattened ball would be of such shape as to allow the light beam to strike all the cells behind the screen, thereby causing all the control relays to operate and subsequently completing the circuits for the trap electromagnets. Electromagnet 53 is energized over a circuit which may be traced from grounded battery 39, anode and cathode of cell 35 in compartment 33, conductor 60, associated amplifier 40, armature and contact of relay 44, winding of electromagnet 53, to ground. Upon the operation of all the traps and the release of the ball under inspection, the ball will fall into receptacle 45 since this is the first opening in the chute 12. In accordance with this invention the inspection and distribution of small articles of manufacture is continuous and entirely automatic and eliminates errors of inspection such as would occur in visual inspection. Furthermore, this arrangement accomplishes 100% inspection of the articles in the lot and accurately distributes the articles according to definite sizes. A modified arrangement of the inspection apparatus is shown in Fig. 5 in which the projection microscope, screen and light sensitive devices are positioned in a line at right angles to the travel of the bearing balls which are to be inspected and distributed.

Various other arrangements may be employed to accomplish individual requirements in accordance with this invention. For instance, as shown in Fig. 6 a vertical chute 61 having distributing passageways 62 extending therefrom and operable traps 63 for closing the vertical chute and shunting the articles into any of the passageways 62 is provided for the inspection of articles, such as hexagonal nuts 64. The nuts may be fed from a hopper, the same as shown in Fig. 1 to a table 65, and lined up by any suitable means, such as a traveling rail 66. When the nut 64 reaches the center of the trap 67 which is level with the table 65 it is positioned on the optical axis of the projecting microscope shown in Fig. 1. In this arrangement the operation of the electromagnet 68 releases the nut under inspection and allows it to fall down the chute 61. Similarly, the simultaneous action of the electromagnets 68 and 69, 70 or 71 shunts the nut 64 into one of the passageways 62 leading from the chute 61.

While the above description relates to specific embodiments of the invention it is understood that various modifications may be made in the assembly and structure of the elements without departing from the scope of the invention as defined in the appended claims.

What is claimed is:

1. In an automatic inspection system, a plurality of light responsive devices, and light projecting means to produce a shadow image of an article upon certain of said devices, other of said devices outside the range of said shadow image causing the articles under inspection to be controlled in accordance with its size or configuration.

2. In an automatic inspecting system, a plurality of light responsive devices, means for causing a beam of light to impinge on said devices, a portion of said beam being obstructed by an article to be inspected so that a shadow of the article forms a mask on some of said devices, and means operated by the devices responsive to said light beam to cause the article under inspection to be controlled in accordance with the shadow produced on said devices.

3. In an automatic inspection mechanism, a plurality of light sensitive devices arranged in a plane, a light source, means to feed an article of manufacture having a configuration to be measured and inspected between said light source and said light sensitive devices, said light source projecting a beam of light upon at least one of said devices, other of said devices being masked by the shadow image of the article to be measured and inspected, and means actuated by at least one of said devices unobstructed by the shadow mask of the article under inspection to govern the classification of the article according to its size.

4. In an automatic inspecting and distributing system, a plurality of light responsive devices, light projecting means to produce a magnified shadow mask of an article to be inspected upon some of said devices, a plurality of receptacles, and means actuated by other of said devices, on which no mask appears to actuate mechanisms associated with said receptacles to distribute the article under inspection to a particular receptacle.

5. In an automatic inspecting and distributing system, light projecting means to produce a magnified shadow image of an article under inspection, a series of light responsive devices arranged in a plane at right angles to the axis of said projecting means, some of said devices being outside the range of the shadow image projected from the article under inspection, a plurality of receptacles, and means energized by said devices outside the range of the shadow image to cause the article under inspection to be deposited in one of said receptacles.

6. In an automatic inspecting and distributing mechanism, a series of light responsive devices, a light source, means to project a beam of light upon said devices, means to position an article to be inspected in the optical axis of said light beam, the article producing a shadow mask on some of said light responsive devices, a plurality of receptacles, amplifying means associated with said light responsive devices, and operative means connected to said amplifying means actuated by said light responsive devices unobstructed by the shadow mask to cause the article under inspection to be distributed to one of said receptacles.

7. In an automatic inspecting and sorting mechanism, a screen, light projecting means to produce on said screen a magnified shadow image of the article to be inspected, a plurality of light responsive devices associated with said screen to receive light from said light projecting means in combination with the shadow image, a plurality of receptacles, and means actuated by said light responsive devices to sort the article under inspection into one of said receptacles.

8. The method of inspecting and sorting articles of manufacture by the use of light responsive devices which comprises, obscuring some of said devices with a shadow of the article under inspection, subjecting other devices to the influence of light, and automatically controlling the sorting of the article under inspection in accordance with the influence of light upon said devices.

9. The method of inspecting and sorting articles of manufacture by the use of light responsive devices, which comprises projecting a light beam upon the article to be inspected, subjecting certain of said devices to light rays, masking other of said devices by a shadow of the article under inspection, and sorting the article under inspection according to its configuration.

In witness whereof, I hereunto subscribe my name this 18th day of November A. D., 1927.

REGINALD L. JONES.